UNITED STATES PATENT OFFICE.

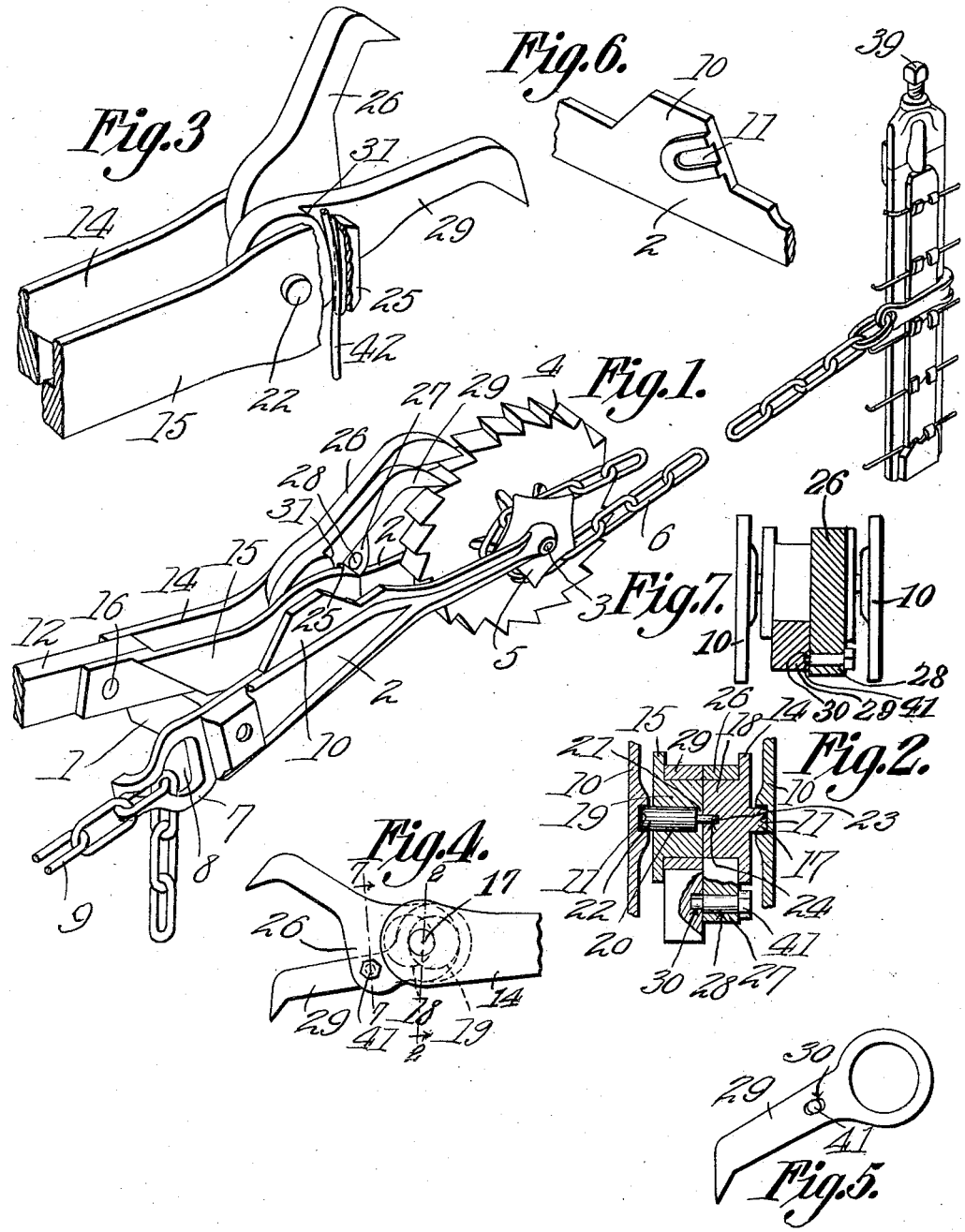

FOREST GIBSON, OF YELK, WEST VIRGINIA.

WIRE-STRETCHER.

1,079,700.   Specification of Letters Patent.   Patented Nov. 25, 1913.

Application filed April 25, 1912. Serial No. 693,278.

*To all whom it may concern:*

Be it known that I, FOREST GIBSON, a citizen of the United States, residing at Yelk, in the county of Pocahontas and State of West Virginia, have invented a new and useful Wire-Stretcher, of which the following is a specification.

One object of the present invention is to provide a wire stretcher in which the bearing heads for the pawls are operatively connected in a novel manner.

A further object of the invention is to provide novel means for assembling the stretcher with the wires or other elements to be stretched.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows the invention in perspective; Fig. 2 is a transverse section on the line 2—2 of Fig. 4; Fig. 3 is a perspective of a portion of the actuating lever; Fig. 4 is a side elevation of the structure shown in Fig. 3; Fig. 5 is an elevation of one pawl; Fig. 6 is a fragmental elevation of a portion of the body member; and Fig. 7 is a section on the line 7—7 of Fig. 4.

The wire stretcher herein disclosed comprises a body member 1 having spaced arms 2 carrying a shaft 3 on which is journaled a ratchet wheel 4 carrying an auxiliary chain wheel 5 adapted to engage a chain 6, connected to a wire clamp 39. One of the arms 2 is provided with an extension 7 having a key-hole slot 8 adapted to hold the chain 9. The arms 2 are provided with upstanding ears 10 having recesses 11 in their adjacent faces which open at their ends toward the ratchet wheel 4.

The invention further includes a lever 12 including a fixed arm 14 and a movable arm 15 held in place by a pivot element 16. The fixed arm 14 is provided with a bearing stud 17 on its outer face, the inner face of the arm 14 carrying a bearing head 18. The inner face of the arm 15 is provided with a bearing head 19, the heads 18 and 19 being eccentrically disposed with respect to each other. There is a recess 20 in the head 19, the recess being formed at its inner end with a shoulder 21 through which there is an opening. A bearing pin 22 extends through the arm 15 and enters the recess 20, the bearing pin 22 having a reduced extension 23 which registers in the recess 24 formed in the inner face of the head 18. The bearing pin 22, its extension 23 and the recesses 11 are co-axial, in order to allow the lever 12 to swing. Further, in order to allow the pawls 26 and 29 to operate they must be eccentric not only to each other, but, as well to the axis defined by the parts 22, 23 and 11. This construction is necessary in order that one pawl may not act merely as a holding pawl.

With regard to the pivotal connection between the parts 15 and 16 it may be stated that there is no operative pivotal movement of the part 15 on the part 16, owing to the presence of the pin 22 and its extension 23. The element 16 renders the arm 15 removable, as is necessary, in order that the device may be assembled, and the nature of the connection between 15 and 12 is such that there would be a pivotal movement of 15 on 16; but for the presence of the pin 22—23.

The bearing stud 17 and the pin 22 are engaged pivotally in the open ended recesses 11 of the ears 10 which are formed upon the arms 2 of the body member 1.

The bearing head 18 of the arm 14 supports a pawl 26 provided with an extension 27 having an opening 28. A pawl 29 is mounted on the head 19 of the arm 15, the pawl 29 having in the inner face a recess 30. Upon its outer face the pawl 29 is fashioned with a cam 31 adapted to coöperate with the jaw 25 formed upon the free end of the arm 15.

The chain 9 is assembled with a fixed support of any sort, and if a reciprocatory motion be imparted to the lever 12, the pawls 26 and 29 will engage alternately with the ratchet wheel 4, one pawl dipping over the ratchet wheel while the other pawl is rotating the ratchet wheel, this result being accomplished owing to the eccentric relation of the heads 18 and 19 upon which the pawls 26 and 29 are respectively mounted for swinging movement. When rotatory motion is imparted to the ratchet wheel 4 in the manner hereinbefore described, the chain wheel 5 will reel in the chain 6, and consequently put the fence wire under tension.

The lever and its attendant pawls may be removed bodily from the body member 1 by thrusting the lever toward the ratchet wheel 4, whereupon the elements 17 and 22 will ride out of the open, forward ends of the recesses 11.

When the lever 12 and its attendant parts have thus been disconnected from the body member 1, the lever itself may be employed as a wire stretcher. Under such circumstances, a pin 41 is passed through the opening 28 in the ear 27 of the pawl 26, the inner extremity of the pin 41 engaging in the recess 30 which is fashioned in the inner face of the pawl 29. The pawls 29 and 26 will thus be held against relative movement. A single strand of wire denoted by the numeral 42 may be engaged between the cam 31 of the lever 29 and the shoulder 25 of the arm 15 of the lever. The free end of the pawl 29 may then be engaged with a fixed support, such as a fence post, the fence post acting as a fulcrum. When the lever 12 is swung around the fence post, the wire 42 will be drawn taut, the free end of the pawl 26 ultimately coming into contact with the fence post and constituting a new fulcrum point for the lever 12.

Having thus described the invention, what is claimed is:—

1. In a wire stretcher, a body member including spaced arms; a ratchet wheel journaled for rotation between the arms; means connected with the ratchet wheel for receiving a flexible element; the arms being provided in their forward ends with recesses opening at their outer ends toward the ratchet wheel; a lever having bearing elements adapted to be slid into the open ends of the recesses; and a pawl carried by the lever and adapted to engage the ratchet wheel.

2. In a device of the class described, a body member; a ratchet wheel journaled for rotation thereon; means upon the ratchet wheel for receiving a flexible element; a lever fulcrumed upon the body member and provided with eccentrically disposed heads; pawls carried by the heads and adapted to engage the ratchet wheel; a connecting element projecting laterally from one pawl, there being a recess in the adjacent face of the other pawl, into which the connecting element is adapted to move.

3. As an article of manufacture for use in a wire stretcher, a lever provided with spaced arms, said arms being provided with eccentrically disposed heads; pawls mounted upon the heads, and a connecting element projecting laterally from one pawl, and adapted to engage in a recess formed in the adjacent face of the other pawl.

4. As an article of manufacture, a lever for use in a wire stretcher, the lever having spaced arms provided upon their inner faces with eccentrically disposed heads, one arm being provided with an outstanding bearing stud and the other arm being movable and having an opening extended through its head; a pin extended through the opening and engaging the head of the other arm to maintain the movable arm against movement and to hold the heads in eccentric relation and to form a laterally projecting bearing; and pawls mounted to swing upon the heads.

In testimony that I claim the foregoing as my own, I have hereto affixed my signature in the presence of two witnesses.

FOREST GIBSON.

Witnesses:
SELMA WILLSON,
ERNEST F. RILEY.

---

Copies of this patent may be obtained for five cents each, by addressing the "Commissioner of Patents, Washington, D. C."